May 24, 1927.

H. B. ROOK 1,629,971

SOUND REPRODUCING INSTRUMENT

Filed July 7, 1921  3 Sheets-Sheet 1

INVENTOR
HARRY B. ROOK,
BY
Everett Rook,
ATTORNEYS.

May 24, 1927.

H. B. ROOK 1,629,971

SOUND REPRODUCING INSTRUMENT

Filed July 7, 1921   3 Sheets-Sheet 2

INVENTOR
HARRY B. ROOK,
BY
Everett Rook,
ATTORNEYS.

May 24, 1927.

H. B. ROOK 1,629,971

SOUND REPRODUCING INSTRUMENT

Filed July 7, 1921

INVENTOR
HARRY B. ROOK,
BY
Everett Rook,
ATTORNEYS.

Patented May 24, 1927.

1,629,971

UNITED STATES PATENT OFFICE.

HARRY B. ROOK, OF NEWARK, NEW JERSEY.

SOUND-REPRODUCING INSTRUMENT.

Application filed July 7, 1921. Serial No. 482,909.

The objects of this invention are to provide a novel and improved construction to secure in a sound reproducing instrument discharge of the sound annularly around the sound reproducing mechanism; to locate the sound reproducing mechanism, including the motor, within the chamber or passage of the sound discharge means, so as to obtain a compact construction; to provide such a construction, and means for conveying the sound from the sound reproducer inwardly through the inner end of the sound discharge member whereby the sound is projected through the outer end of the sound discharge member as in a horn or megaphone; to provide such a construction in which the tone arm carrying a sound reproducer is mounted at the rear end of said sound discharge member and behind the turntable so as not to interfere with the placing of records upon or removal thereof from the turntable; to locate said mechanism within a sound discharge member and spaced at a distance from its walls, whereby there is slight impedance of the passage of the sound waves; to provide for the passage of sound through the usual motor supporting partition of a sound reproducing instrument; to thus enable sound passing from the tone arm of an instrument to either side of said partition to be discharged upon the other side thereof; to secure a construction by which the sound discharging means extends on opposite sides of said partition; to thus prevent the said partition from interfering with a single discharge means extending longitudinally of the partition and on both sides thereof; to secure with such a partition an amplifying member which extends both above and below the partition; to slot or aperture the partition for the purposes above set forth; to obtain other advantages and results as may be brought out by the following description, and thus in general to secure a more perfect reproduction of sound.

Referring to the accompanying drawings, in which like numerals of reference indicate the same parts throughout the several views, Figure 1 is a vertical sectional view from front to rear of a sound reproducing instrument embodying my invention, taken on line 1—1 of Fig. 2;

Figure 1:
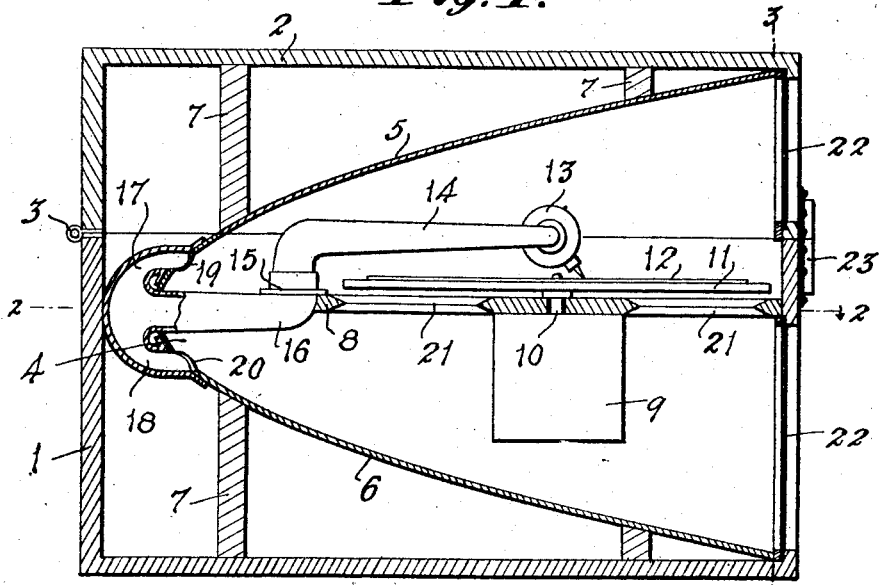
Figure 2:
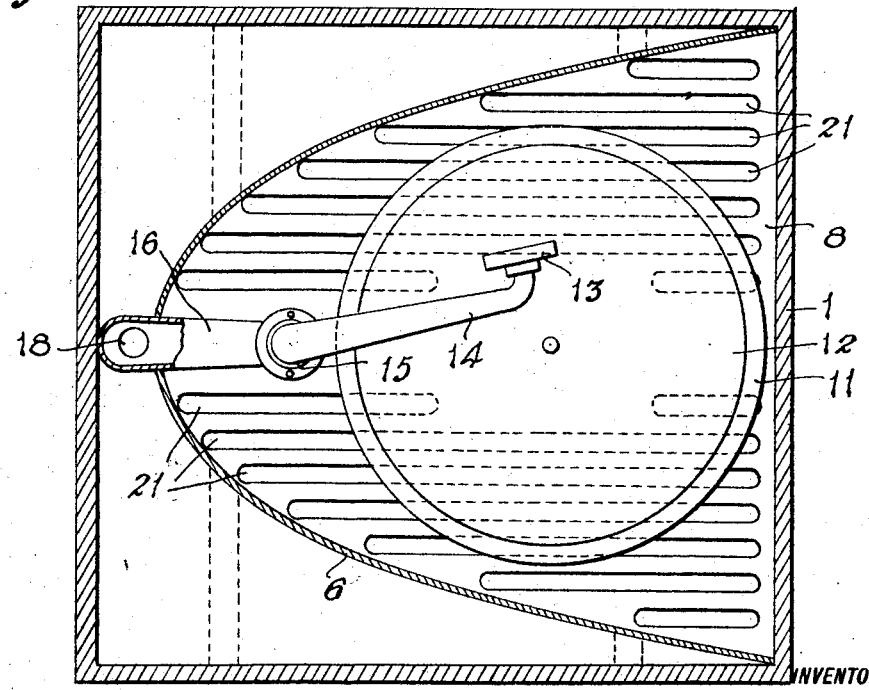
Figure 2 is a horizontal sectional view, with the casing, horn and part of the tone arm in section on line 2—2 of Fig. 1.
Figure 3:
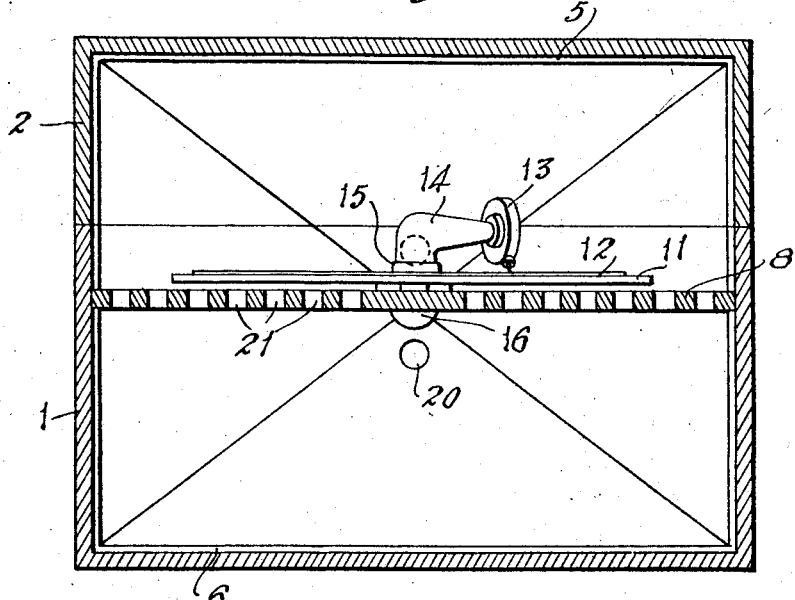
Figure 3 is a transverse vertical section on line 3—3 of Fig. 1.

In the specific embodiment of the invention shown in said drawings and particularly Figures 1-4 thereof, 1 indicates the box or body part of a casing which may be of any suitable form or configuration and 2 indicates a cover therefor hinged as at 3. I have shown the casing as a rectangular box, but this is only for convenience of illustration. Within said box or casing is shown a horn 4 with its bell or mouth facing the front upright side of the casing and its throat or small end centrally adjacent the opposite upright side. This horn is shown of four-sided pyramidal cross-sectional shape, but might be of any other suitable cross-section. It is divided horizontally upon the plane of division between the body 1 of the casing and cover 2, and the respective upper and lower parts 5 and 6 of the horn thus formed, are carried by the cover and body of the box or casing, being supported thereon in any suitable manner as by ribs 7 projecting from the walls of the casing.

Figure 4:
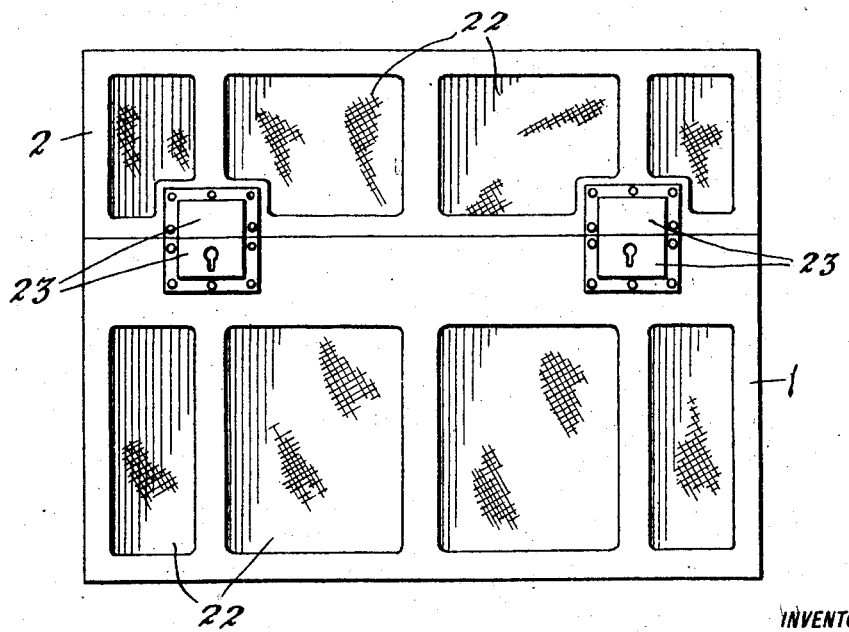
Figure 4 is a front elevation;

In the construction shown I have located the plane of division of the horn sections 5 and 6 above the central axial line of the horn, and placed at said central axial line a partition 8 which extends horizontally of the box or body 1 of the casing and provides beneath itself a motor chamber. The motor 9 depends from said partition 8 with a spindle or shaft 10 projecting above said partition to carry the turntable 11 to receive a record 12. One known type of phonograph sound box or reproducer 13 is shown in engagement with said record and from it a tone arm 14 extends rearward and is provided with a swivel joint 15 preferably mounted in the partition 8. From said swivel joint an extension 16 of the tone arm extends horizontally rearward along the central axial line of the horn outwardly through the small end of the horn and its passageway has diametrically opposite branches 17, 18 which are returned upon the tone arm and open into the throat or inner end of the horn as at 19, 20. The horn projects the sound forwardly from said openings 19 and 20 above and below the partition 8 which is apertured or slotted as at 21 to permit free passage of the sound in either direction through said partition. The sound is thus discharged annularly around the sound reproducing mechanism, consisting of the motor, turntable, sound box and tone arm, and escapes through the front of the box or casing which is of any suitable openwork construction for the purpose. As illustrated in Figure 4, I have shown the front of both the body 1 and cover 2 of the box of grille work closed by the usual silk 22, see Figure 1, and for purposes of fastening the cover 2 in closed relation to the body 1 I have shown locks 23.

It will be understood that in the construction shown the closure or cover 2 is opened to put on and take off records and then closed while the instrument is playing, the horn or sound discharge means provided both above and below the partition 8 carrying the reproducing mechanism tending to enable a much more perfect reproduction of sound to be obtained.

Figure 5:
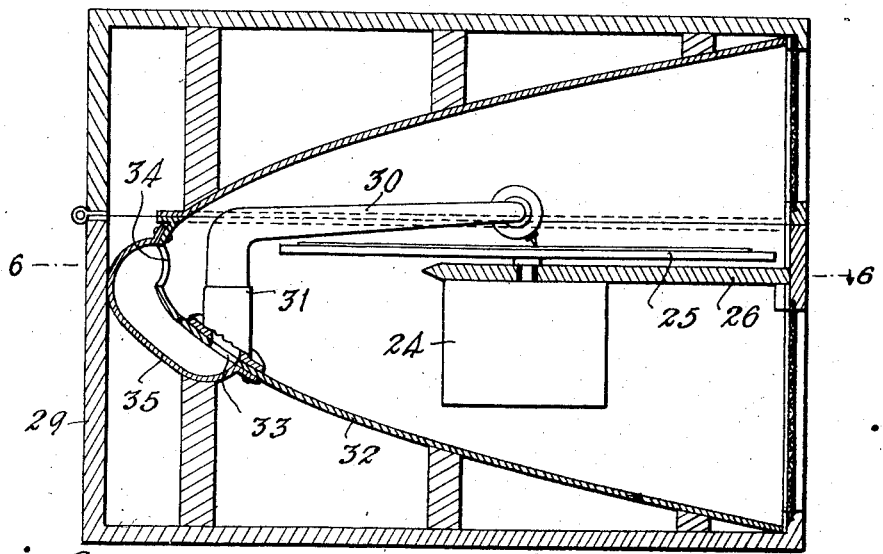
Figure 5 is a vertical central section from front to rear, similar to Fig. 1, but illustrating certain modifications of construction.
Figure 6:
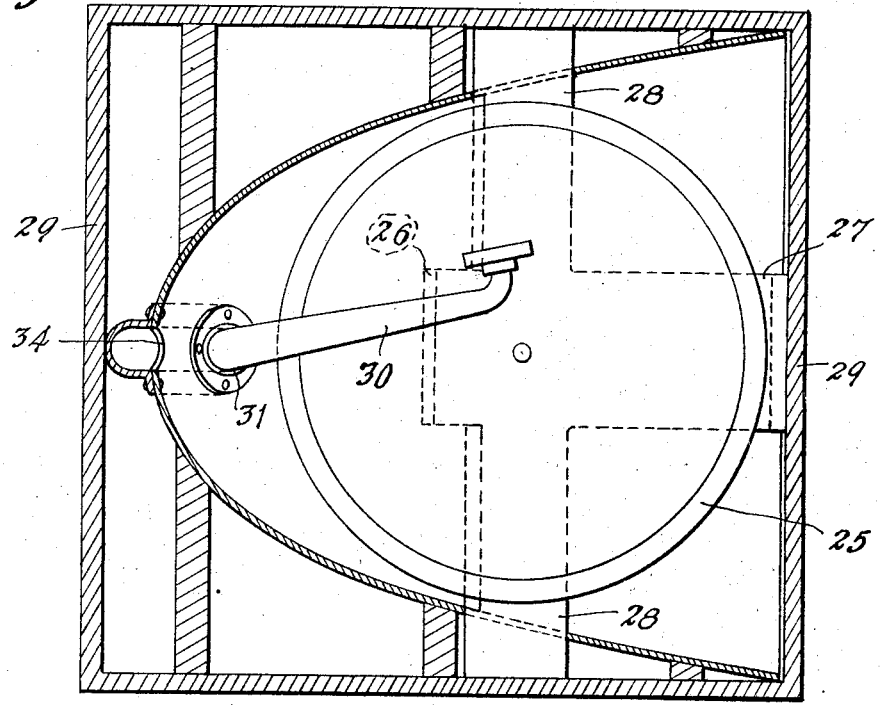
Figure 6 is a plan of the same with the casing and horn in section on line 6—6 of Fig. 5.

In Figures 5 and 6 I have shown a modified construction in which the motor 24 and turntable 25 are supported by a partition 26 which is more distinctly of a spider formation, consisting of three arms 27 and 28, 28 extending to the front and side walls of the box or body 29 of the casing. Also the tone arm 30, beyond its swivelling 31, has its passageway extending laterally through the side of the horn 32, as at 33, and returned by a conduit 35 exterior of the horn centrally through the throat of the horn as at 34.

With this construction the space occupied by the sound discharge member is utilized to great advantage and the sound and amplifying capacity of the instrument greatly increased. Furthermore, the sound is discharged and amplified in the manner common to horns or megaphones, the sound being conveyed inwardly through the walls of the member at the throat end thereof and projected outwardly through the mouth or bell.

It will be understood that the form or shape of the casing and of the sound discharge means may be varied at will, and various other detail modifications made in the manufacture of my improvements, by those skilled in the art, without departing from the spirit or scope of the invention. Furthermore, the invention is susceptible of use with other types of sound reproducing mechanism, for instance, radio receiving apparatus. Therefore I do not wish to be understood as limiting myself, except as required by the following claims when construed in the light of the prior art.

Having thus described the invention, what I claim is:

1. In a sound reproducing instrument, the combination of a sound discharge member, a substantially flat perforate partition disposed within and substantially longitudinally of said sound discharge member to permit passage of sound waves from one side to the other of said partition, and sound reproducing mechanism mounted on said partition to direct sound waves into said sound discharge member.

2. In a sound reproducing instrument, the combination of a sound reproducing mechanism including a motor, turntable and tone arm, of a sound discharge member, and a motor supporting partition arranged longitudinally of said sound discharge member and provided with transverse openings to permit passage of sound waves therethrough from one side of said partition to the other.

3. In a sound reproducing instrument, the combination with a sound reproducing mechanism, of a motor supporting partition having transverse openings therethrough, a horn section at one side of said partition, a second horn section at the other side of said partition, and means for conveying sound from said reproducing mechanism into both of said horn sections.

4. In a sound reproducing instrument, the combination of a sound reproducing mechanism including a motor, turntable and tone arm, of a sound discharge member annularly surrounding said sound reproducing mechanism and having an open outer end and closed inner end, means for mounting said tone arm at the inner end of said sound discharge member, and means for conveying sound therefrom inwardly through the inner end of said sound discharge member so that the sound is directed outwardly through said outer end.

5. In a sound reproducing instrument, the combination with sound discharge means extending both above and below the turntable, of a support for said turntable arranged longitudinally of the sound discharge means and intermediate its opposite sides, said support permitting the passage of sound from one side to the other of itself.

6. In a sound reproducing instrument, the combination of a horn-like sound discharge member, a perforate partition disposed within and substantially longitudinally of said sound discharge member to permit passage of sound waves from one side to the other of said partition, a sound reproducer to discharge sound waves inwardly through the small end of said sound discharge member so that the sound is directed outwardly through the large end of said sound discharge member, and means mounted on said perforate partition for controlling operation of said sound reproducer.

HARRY B. ROOK.